United States Patent
Robinson et al.

(10) Patent No.: US 9,438,816 B2
(45) Date of Patent: Sep. 6, 2016

(54) ADAPTIVE IMAGE ACQUISITION FOR MULTIFRAME RECONSTRUCTION

(71) Applicant: Ricoh Co., Ltd., Tokyo (JP)

(72) Inventors: M. Dirk Robinson, Menlo Park, CA (US); Junlan Yang, Chicago, IL (US); David G. Stork, Portola Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/551,998

(22) Filed: Nov. 24, 2014

(65) Prior Publication Data

US 2015/0264245 A1    Sep. 17, 2015

Related U.S. Application Data

(63) Continuation of application No. 12/079,555, filed on Mar. 26, 2008, now Pat. No. 8,897,595.

(51) Int. Cl.
*H04N 5/235* (2006.01)
*G06T 5/50* (2006.01)
*H04N 5/232* (2006.01)
(Continued)

(52) U.S. Cl.
CPC ............ *H04N 5/2355* (2013.01); *G06T 1/0007* (2013.01); *G06T 5/50* (2013.01); *G06T 7/0022* (2013.01); *G06T 7/0069* (2013.01); *H04N 5/235* (2013.01); *H04N 5/2352* (2013.01); *H04N 5/2356* (2013.01); *H04N 5/23212* (2013.01); *G06T 2207/10004* (2013.01); *G06T 2207/20208* (2013.01)

(58) Field of Classification Search
CPC ............... H04N 5/2356; H04N 5/235; H04N 5/23212; H04N 5/2355
See application file for complete search history.

(56) References Cited

U.S. PATENT DOCUMENTS 5,193,124 A * 3/1993 Subbarao ............... G01C 11/02
                                                    348/349
5,227,890 A    7/1993 Dowski, Jr.
5,521,695 A    5/1996 Dowski
(Continued)

FOREIGN PATENT DOCUMENTS

EP    0814605    12/1997
EP    0998124    5/2000
(Continued)

OTHER PUBLICATIONS

F. Rooms et al, PSF Estimation with applications in autofocus and image restoration, IEEE 2002.*
(Continued)

*Primary Examiner* — James Hannett
(74) *Attorney, Agent, or Firm* — Fenwick & West LLP

(57) ABSTRACT

Multiframe reconstruction combines a set of acquired images into a reconstructed image. Here, which images to acquire are selected based at least in part on the content of previously acquired images. In one approach, a set of at least three images of an object are acquired at different acquisition settings. For at least one of the images in the set, the acquisition setting for the image is determined based at least in part on the content of previously acquired images. Multiframe image reconstruction is applied to the set of acquired images to synthesize a reconstructed image of the object.

20 Claims, 9 Drawing Sheets
(8 of 9 Drawing Sheet(s) Filed in Color)

(51) Int. Cl.
*G06T 1/00* (2006.01)
*G06T 7/00* (2006.01)

(56) References Cited

U.S. PATENT DOCUMENTS

| | | |
|---|---|---|
| 5,550,935 A | 8/1996 | Erdem et al. |
| 5,748,371 A | 5/1998 | Cathey, Jr. et al. |
| 5,793,900 A | 8/1998 | Nourbaksh et al. |
| 5,870,179 A | 2/1999 | Cathey, Jr. et al. |
| 5,932,872 A | 8/1999 | Price |
| 5,956,436 A * | 9/1999 | Chien ............... H04N 1/40056 382/312 |
| 6,021,005 A | 2/2000 | Cathey, Jr. et al. |
| 6,069,738 A | 5/2000 | Cathey, Jr. et al. |
| 6,519,359 B1 | 2/2003 | Nafis et al. |
| 6,525,302 B2 | 2/2003 | Dowski, Jr. et al. |
| 6,842,297 B2 | 1/2005 | Dowski, Jr. |
| 6,873,733 B2 | 3/2005 | Dowski, Jr. |
| 6,911,638 B2 | 6/2005 | Dowski, Jr. et al. |
| 6,940,649 B2 | 9/2005 | Dowski, Jr. |
| 7,027,221 B2 | 4/2006 | Hamborg |
| 7,158,182 B2 | 1/2007 | Watanabe et al. |
| 7,612,804 B1 | 11/2009 | Marcu et al. |
| 8,897,595 B2 * | 11/2014 | Robinson ................ G06T 5/50 382/284 |
| 2002/0118457 A1 | 8/2002 | Dowski, Jr. |
| 2002/0195548 A1 | 12/2002 | Dowski, Jr. et al. |
| 2003/0057353 A1 | 3/2003 | Dowski, Jr. et al. |
| 2003/0169944 A1 | 9/2003 | Dowski, Jr. et al. |
| 2003/0173502 A1 | 9/2003 | Dowski, Jr. et al. |
| 2004/0145808 A1 | 7/2004 | Cathey, Jr. et al. |
| 2004/0190762 A1 | 9/2004 | Dowski, Jr. et al. |
| 2004/0228005 A1 | 11/2004 | Dowski, Jr. |
| 2004/0257543 A1 | 12/2004 | Dowski, Jr. et al. |
| 2005/0088745 A1 | 4/2005 | Cathey, Jr. et al. |
| 2005/0117114 A1 | 6/2005 | Jiang |
| 2005/0129327 A1 | 6/2005 | Hillis et al. |
| 2005/0197809 A1 | 9/2005 | Dowski, Jr. |
| 2005/0264886 A1 | 12/2005 | Dowski, Jr. |

FOREIGN PATENT DOCUMENTS

| | | |
|---|---|---|
| JP | H 11-196315 | 7/1999 |
| JP | 2006-333229 | 12/2006 |
| WO | WO 2004/063989 | 7/2004 |

OTHER PUBLICATIONS

F Rooms et al, PSF Estimation with applications in autofocus and image restoration, IEEE 2002.

Bascle et al, "Motion Deblurring and Super-resolution from an Image Sequence" ECCV'96.

Cathey, W. Thomas et al., "New paradigm for imaging systems," Applied Optics, vol. 41, No. 29, Oct. 10, 2002, pp. 6080-6092.

European Search Report, EP06253130, Sep. 26, 2005, 7 pages.

Fales, C.L. et al., "Imaging System Design for Improved Information Capacity," Applied Optics, Mar. 15, 1984, pp. 872-888, vol. 23, No. 6.

Maeda, Peter Y. et al., "Integrating lens design with digital camera simulation," 5678 SPIE Proceedings SPIE Electronic Imaging, San Jose, CA, Feb. 2005, pp. 48-58.

Japanese Office Action, Japanese Application No. 2009-075210, Apr. 16, 2013, 6 pages (with concise explanation of relevance).

United States Office Action, U.S. Appl. No. 12/079,555, filed Jan. 31, 2014, 7 pages.

United States Office Action, U.S. Appl. No. 12/079,555, filed Feb. 29, 2012, 16 pages.

United States Office Action, U.S. Appl. No. 12/079,555, filed May 11, 2011, 14 pages.

* cited by examiner

ADAPTIVE IMAGE ACQUISITION FOR MULTIFRAME RECONSTRUCTION

CROSS-REFERENCE TO RELATED APPLICATION(S)

This application is a continuation of U.S. patent application Ser. No. 12/079,555, "Adaptive image acquisition for multiframe reconstruction," filed Mar. 26, 2008. The subject matter of all of the foregoing is incorporated herein by reference in their entirety.

BACKGROUND OF THE INVENTION

1. Field of the Invention

This invention relates generally to multiframe image reconstruction techniques and, more particularly, to the adaptive acquisition of image frames for use in multiframe reconstruction.

2. Description of the Related Art

Real world scenes contain an extremely wide range of focal depths, radiance and color and thus it is difficult to design a camera capable of imaging a wide range of scenes with high quality. To increase the versatility of its imaging system, most cameras have adjustable optical settings, such as the focus, exposure, and aperture. In most such systems, the camera includes some form of automatic adjustment of these settings depending on the object scene, such as auto-focus (AF), automatic gain (AG), and auto-exposure (AE) algorithms. These automatic algorithms typically use image data to perform adjustment. The camera will capture multiple images under different acquisition settings until it finds the optimal settings for a single image. The adjustment process often consumes significant power to adjust the focus and aperture settings. Finding efficient algorithms for automatically adjusting the camera settings is thus important for minimizing power consumption as well as improving performance for the user.

Traditional settings adjustment algorithms rely on multiple tests in order to find the best settings for acquiring a single image. A large class of alternate image processing algorithms, known as multiframe reconstruction algorithms combine a set of multiple images to synthesize a single image of higher quality. Such multiframe algorithms operate on a set of images where each image contains different information about the scene. The reconstruction algorithm combines these multiple sources of information, typically based on information about the source of the image variations (shifts, defocus, exposure level, etc.) to form a single reconstructed image. Typically, the set of images is captured using predetermined acquisition settings. In other words, the acquisition settings do not depend on image content. The traditional problem addressed by multiframe reconstruction is then, given the set of already acquired images, synthesize the best quality reconstructed image from the set of available images.

The choice of acquired images, however, can significantly affect the quality of the final reconstructed image. Multiframe reconstruction combines different information from different images into the single reconstructed image. However, if no image in the set has collected certain information, then that information cannot be represented in the reconstructed image. More generally, some visual information is more important than other information when constructing an image of a particular scene. Therefore, there is a need for multiframe reconstruction techniques that actively select which images should be acquired, in addition to combining the acquired images into a reconstructed image.

SUMMARY OF THE INVENTION

The present invention overcomes the limitations of the prior art in multiframe imaging by automatically selecting which images to acquire based at least in part on the content of previously acquired images. In one approach, a set of at least three images of an object are acquired at different acquisition settings. For at least one of the images in the set, the acquisition setting for the image is determined based at least in part on the content of one or more previously acquired images. In one approach, the acquisition parameters for the K+1 image are (optimally) adjusted based on the information in the previously acquired K images, where "optimally" refers to the final image quality of the K+1 multiframe reconstructed image. Multiframe reconstruction is applied to the set of acquired images to synthesize a reconstructed image of the object.

In a common implementation, image acquisition begins with the acquisition of at least two initial images at acquisition settings that do not depend on content of previously acquired images. Then, for every image acquired after the initial images, the acquisition setting for the image is determined based at least in part on content of previously acquired images. The acquisition setting for later images can be determined in a number of different ways. For example, it can be determined without regard to whether any additional images will be acquired afterwards. Alternately, it can be determined assuming that at least one additional image will be acquired afterwards. In yet another alternative, it can be determined assuming that a total of K images will be acquired.

In another aspect, the acquisition setting can be based on increasing a performance of the multiframe reconstruction, given the previously acquired images. One approach measures performance based on maximum likelihood estimation, including for example using the Cramer-Rao performance bound. The acquisition setting can also be based on increasing the information captured by the image, compared to the information already captured by previously acquired images.

In yet another aspect, the acquisition setting is based on reducing change in the acquisition setting relative to the immediately previously acquired image, for example to conserve energy and/or reduce the time lag between acquisitions. The cost or merit function could also include power, energy, or time constraints associated with changing the acquisition settings. Thus, for instance, if camera battery power is of significant concern, the merit function can penalize large lens motions which require significant power consumption.

Examples of parameters that may be determined as part of the acquisition setting include aperture, focus, exposure, spatial shift, and zoom.

Other aspects of the invention include systems, devices, components and applications corresponding to the methods described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Outline

Figure 1:
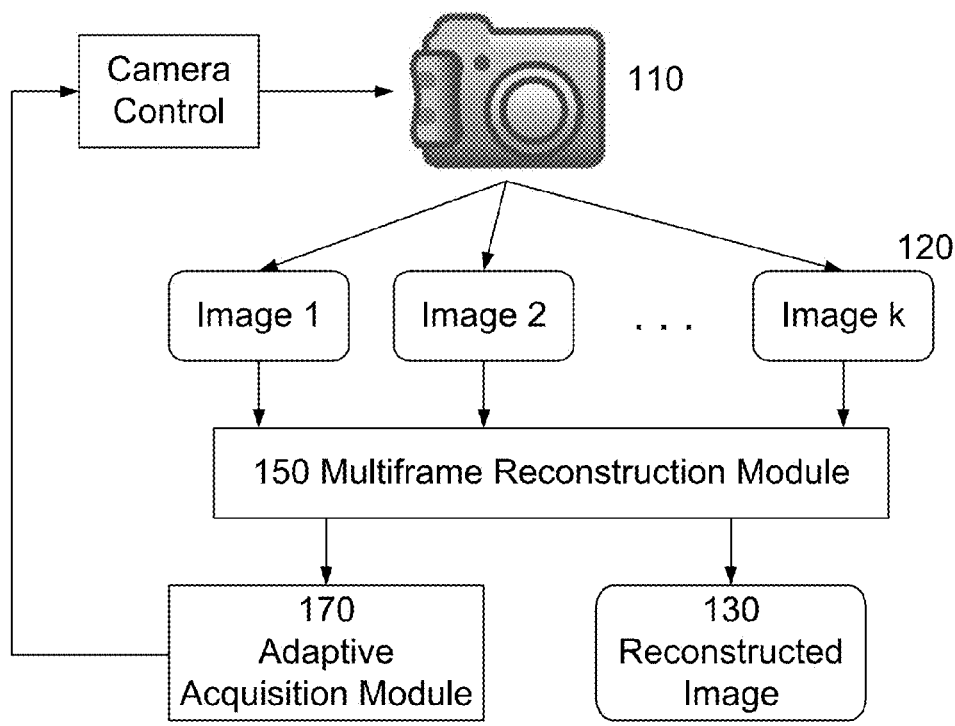
FIG. 1 is a diagram illustrating adaptive image acquisition for multiframe reconstruction.

I. Overview
II. Multiframe Reconstruction
III. Adaptive Image Acquisition
   III.A. MSE Estimate
   III.B. Determining Acquisition Setting based on RMSE
   III.C. Determining Acquisition Setting based on RMSE and Energy Constraints
   III.D. Objects with Depth
IV. Simulation Results
V. Further Embodiments I. Overview FIG. 1 is a diagram illustrating one example of adaptive image acquisition for multiframe reconstruction. A camera (or other image capture device) 110 acquires a set 120 of images: image 1, image 2, etc. This set of images 120 is used to synthesize a reconstructed image 130, using conventional multiframe reconstruction techniques (in this example, implemented by module 150). In conventional multiframe reconstruction, the images 120 would be acquired using a predetermined set of acquisition settings. For example, the focus may be shifted to different predetermined positions to acquire a set of images 120 at different focuses.

However, this is not the case in FIG. 1. Instead, image acquisition is adaptive. Which image is acquired next depends on functions computed from the previously acquired images. For example, the camera 110 may acquire image 1 and image 2 at two different focuses. Based on the output of processing these images, adaptive acquisition module 170 determines the acquisition setting (e.g., the focus) for image 3. After image 3 is acquired, the module 170 may then determine the acquisition setting for image 4, and so on. In this way, the set of adaptively acquired images 120 should yield a better reconstructed image 130 than a set based on predetermined acquisition settings.

From an information point of view, the adaptive acquisition module 170 preferably selects images so that the set of images 120, as a whole, contain as much visual information as possible about the scene. Accordingly, which next image adds the most new information to the set will depend in part on what information has already been collected by previously acquired images and also in part on what information is thought to be missing or poorly represented based on analysis of the previously acquired images. While each individual image may itself be poor quality, as a collection, the set of images preferably contain a significant amount of information about the scene. This differentiates the adaptive multiframe approach from the conventional single-frame approaches, such as autoexposure and autofocus, which find the best settings for a single captured image.

The following sections develop some of the underlying principles for a specific adaptive approach based on a combination of the Cramer-Rao (CR) Bound and the asymptotic properties of Maximum-Likelihood estimation. Some examples are presented based on the dynamic optimization of focus and aperture settings.

II. Multiframe Reconstruction

Multiframe image reconstruction is usually based on a model of the imaging system as a function of the acquisition setting parameters. This section presents a particular model that is chosen to illustrate the underlying principles. The invention is not limited to this particular model. Other models and underlying assumptions can also be used.

In this example, the captured image is modeled using the linear model $$y_k = H(\phi_k)s + n(\phi_k) \tag{1}$$

where $y_k$ is the kth captured image, H is the sampled optical point spread function, s is the unknown ideally sampled image, and n is the noise inherent to the imaging system. The vector $\phi_k$ represents the acquisition setting for the kth frame. The collection of the acquisition settings for all frames will be referred to as $\Phi$. For simplicity, the following example considers two acquisition setting parameters: the aperture diameter A and the back focal distance d, with a description of how this may be extended to include the exposure time T as well. However, the adaptive approach is not limited to these parameters. Examples of other acquisition setting parameters include the field of view, camera angle (i.e., where the camera is pointed), magnification, wavelength, polarization, and various aspects of illumination including brightness and spatial variation.

The ideal image s is the image formed by an ideal pinhole camera without the effects of diffraction. In other words, it is an image taken from a theoretically infinite depth-of-field camera without noise or diffraction. At first, for simplicity, consider only planar objects which are perpendicular to the camera at an unknown distance z from the front of the camera. Later, this will be extended to scenes having more realistic spatially-varying depths.

Also for purposes of illustration, assume the following about the point spread function (PSF) defining the blurring matrix H. First, assume that the PSF is spatially invariant. Such an assumption is reasonable for expensive optical lens systems or for narrow field of views. This spatial invariance property allows one to conveniently characterize the blurring in the frequency domain using the optical transfer function (OTF) H(w,v) where w,v are the spatial frequencies in the horizontal and vertical directions. In other words, the matrix H is diagonalized by the FFT operator, producing a diagonal matrix whose elements along the diagonal are the system's OTF. Second, assume that the lens system's OTF is dominated by the defocus aberration. The defocus aberration induces optical transfer functions H(w,v,δ) where δ captures the amount of defocus in the optical system. The defocus is proportional to $$\delta = A\left(\frac{1}{f} - \frac{1}{b} - \frac{1}{z}\right), \quad (2)$$

where f is the focal length of the camera, b is the back focal distance, z is the object distance, and A is the diameter of the aperture. This equation comes from the lens-makers equation combined with a geometric characterization of the PSF width. The amount of defocus is a nonlinear function of z and b, and a linear function of A. To simplify the estimation problem, transform the estimation problem into that of estimating the distance in diopters or inverse meters $\zeta=1/z$ and build a corresponding inverse focal function $\beta=1/f-1/b$. Using this reformulation, Eq. 2 can be rewritten as $$\delta = A(\beta - \zeta). \quad (3)$$

For a given estimate of the inverse depth $\hat{\zeta}$ or inverse focal setting β, the transformation can be inverted to obtain the actual depth estimate $\hat{z}$ or back focal distance b. One advantage of this formulation is that units of ζ and β can be normalized into the range [0,1]. Performance will generally be reported on this normalized scale.

Also assume that the total additive noise n includes two types of noise components. The first is a thermal read noise associated with the sampling circuitry. This noise is independent of the image and has a noise power $\sigma_r^2$. The second is a signal-dependent noise related to shot noise. This noise has power which is linearly related to the signal power. Assume that this noise is a function of the average signal value $\mu_s=(\Sigma_m s_m)/M$ where m indexes the pixels and M is the total number of pixels. This noise power is given by $\sigma_s^2=\mu_s\sigma_0^2$ where $\sigma_0^2$ is a baseline power. Notice that as the signal strength increases, this second type of noise can dominate the noise in the captured image. This model suggests that the SNR of the camera improves linearly for weak signals where the read noise dominates, and as the square root of the signal energy for stronger signals.

In many imaging systems, the strength of the signal depends on the number of photons captured in each pixel well. The number of photons captured by the detector is a quadratic function of the aperture diameter A and a linear function of the exposure time T. If the signal is normalized into a preset range (say [0, 1]), then the noise power for the normalized signal is given by $$\sigma^2 = \frac{\sigma_r^2}{A^4 T^2} + \frac{\sigma_s^2}{A^2 T}. \quad (4)$$

The SNR of the captured image is a function of both the exposure time and the aperture setting. In real systems, the pixels of a sensor can hold only a finite number of photons, so the aperture settings and exposure settings preferably are selected to ensure that the signal is just strong enough to saturate the detector for maximum dynamic range and SNR of the individual frames. The exposure could be varied such that certain image regions are saturated to improve the dynamic range in the dark regions.

In the following first example, assume that the exposure time T is fixed but the aperture setting A is adjustable. Given this model, there is an inherent tradeoff between contrast and SNR as a function of the aperture setting A. For example, suppose that an object is located near the camera while the back focal length is set to focus at infinite. By increasing the aperture, one can improve the SNR at the expense of increasing the amount of focus blur.

The forward model of Eq. 1 can be used to construct a statistically optimal multiframe estimation algorithm based on the Maximum-Likelihood (ML) principle. Express the ML cost function in the frequency domain as $$J(s, \zeta) = \sum_k \frac{1}{\sigma_k^2} \int_w \int_v |y_k(w, v) - H(w, v, \varphi_k, \zeta)s(w, v)|^2 \, dw \, dv \quad (5)$$

where $y_k(w,v)$ and $s(w,v)$ are the frequency domain expressions for the kth captured image and the ideal source image, respectively. This is the squared error between the observed kth image $y_k$ and the ideal image s filtered by the OTF using the kth acquisition setting $\phi_k$. When computing the ML cost function, consider only spatial frequency values up to the Nyquist sampling frequency defined by the pixel pitch, and ignore the effects of aliasing artifacts.

Because the unknown image is linearly related to the observed images, the ML estimate for the unknown image if the inverse depth ζ is known, is given by the multiframe Wiener solution $$\hat{s}(w, v) = \frac{\sum_k \frac{1}{\sigma_k^2} H^*(w, v, \varphi_k, \zeta) y_k(w, v)}{\sum_k \frac{1}{\sigma_k^2} |H(w, v, \varphi_k, \zeta)|^2 + P_s^{-1}(w, v)}, \quad (6)$$

where $P_s(w,v)$ is the power spectral density of the ideal source image $s(w,v)$. Substituting this estimate of the high-resolution image back into the cost function yields the following nonlinear cost function as a function of the unknown inverse distance ζ:

$$J(\zeta) = -\int_w \int_v \frac{\left|\sum_k \frac{1}{\sigma_k^2} H^*(w, v, \varphi_k, \zeta) y_k(w, v)\right|^2}{\sum_k \frac{1}{\sigma_k^2} |H(w, v, \varphi_k, \zeta)|^2 + P_s^{-1}(w, v)} \, dw \, dv, \quad (7)$$

Now minimize this cost function using standard gradient descent to estimate the unknown inverse distance ζ. The value of ζ that minimizes the cost function is used as the current estimate for ζ. To perform gradient descent, calculate the analytic derivatives of this cost function with respect to the unknown depth parameter. In general, this search may be performed very quickly as the cost function is one dimensional. Other descent algorithms could be used as well.

One advantage of this multiframe approach is the ability to reproduce a sharp, in-focus image from a set of out-of-focus images if the set of defocused MTFs have non-overlapping zero-crossings. For example, the OTF for an optical system having a square pupil with only defocus aberration can be approximated as a separable MTF taking the form $$H(\rho,\delta)=\Lambda(\rho)\sin c(\delta\rho(1-|\rho|)), \rho \in [-1,1] \quad (8)$$

where $\rho$ is either the horizontal or vertical component normalized spatial frequency coordinates normalized by the Nyquist sampling rate ($\rho=1$). These frequency coordinates are a function of the F/# and the wavelength. The function $\Lambda(x)$ is defined as $\Lambda(x)=\max\{1-|x|, 0\}$; and defines the diffraction limit MTF envelope. The defocus MTF for such a system produces zero crossings where $\delta\rho(1-|\rho|)$ is close to integer values. In between these spatial frequency regions, the phase is inverted, but contrast is preserved. Multiframe reconstruction can take multiple such defocused images and extract the contrast if none of the zero crossings overlap.

III. Adaptive Image Acquisition

III.A. MSE Estimate

The previous section described one example of multiframe reconstruction as a depth estimation problem. Continuing this example, this section describes a dynamic framework for selecting the acquisition setting based on previously acquired images. In the following example, the criterion for the image acquisition is based on predictions of mean-square-error (MSE) performance after multiframe reconstruction. Given that this example implements the ML algorithm, a predictor of performance is the Cramer-Rao (CR) performance bound. The CR bound not only provides a fundamental bound on MSE performance, but also provides a reasonable prediction of MSE performance for ML estimators. The ability to predict MSE performance is based on the asymptotic optimality of the ML estimator. As SNR approaches infinity, or the number of observed frames increases, the ML estimator will asymptotically approach the CR bound. Furthermore, the error distribution on the estimates will also become Gaussian.

The CR bound is defined as the inverse of the Fisher information matrix (FIM). The Fisher information matrix (FIM) for the multiframe reconstruction problem is given by $$J(s,\zeta,\Phi) = \begin{pmatrix} J_{ss} & J_{s\zeta} \\ J_{\zeta s} & J_{\zeta\zeta} \end{pmatrix} \quad (9)$$

where $$J_{ss} = \sum_k \frac{1}{\sigma_k^2} H_k^T H_k \quad (10)$$

$$J_{s\zeta} = [J_{\zeta s}]^T = \sum_k \frac{1}{\sigma_k^2} G_k^T H_k s = \left(\sum_k \frac{1}{\sigma_k^2} G_k^T H_k\right) s \quad (11)$$

$$J_{\zeta\zeta} = \sum_k \frac{1}{\sigma_k^2} s^T G_k^T G_k s = s^T \left(\sum_k \frac{1}{\sigma_k^2} G_k^T G_k\right) s. \quad (12)$$

The matrix $H_k$ is shorthand notation representing the kth frame blur matrix $H(\phi_k,\zeta)$. The term $\sigma_k^2$ is the noise power associated with the kth frame which is a function of the acquisition settings. The matrix $G_k$ is defined as the derivative of the blur matrix with respect to the inverse object distance $\zeta$, that is $$G_k \equiv \frac{\partial}{\partial \zeta} H(\varphi_k, \zeta).$$

This derivative filter is essentially a band-pass filter over the spatial frequencies sensitive to perturbations in the inverse focal distance. Note that the information related to image reconstruction is independent of the object signal.

To compute the CR bound, apply the block matrix inversion lemma on the partitioned FIM to obtain bounds on the MSE of the form $$M_\zeta(\zeta,s,\Phi) \geq (J_{\zeta\zeta} - J_{\zeta s} J_{ss}^{-1} J_{s\zeta})^{-1} \quad (13)$$

$$M_s(\zeta,s\Phi) \geq Tr[J_{ss}^{-1}] + M\zeta(J_{\zeta s} J_{ss}^{-2} J_{s\zeta}). \quad (14)$$

In this representation, the MSE performance bound (either $M_\zeta$ or $M_s$) is a function of the image signal s, the inverse depth $\zeta$, and the set of acquisition settings $\Phi$. Consider the image reconstruction MSE performance predicted by Eq. 14. The predicted MSE in Eq. 14 comprises two terms. The first term is the MSE bound if the depth were known a priori. The second term describes the loss in MSE performance when the inverse depth $\zeta$ is estimated from the data. Eq. 14 will become the merit function in this example adaptive frame capture optimization. As with the multiframe reconstruction, these terms can be computed efficiently in the frequency domain.

Figure 2:
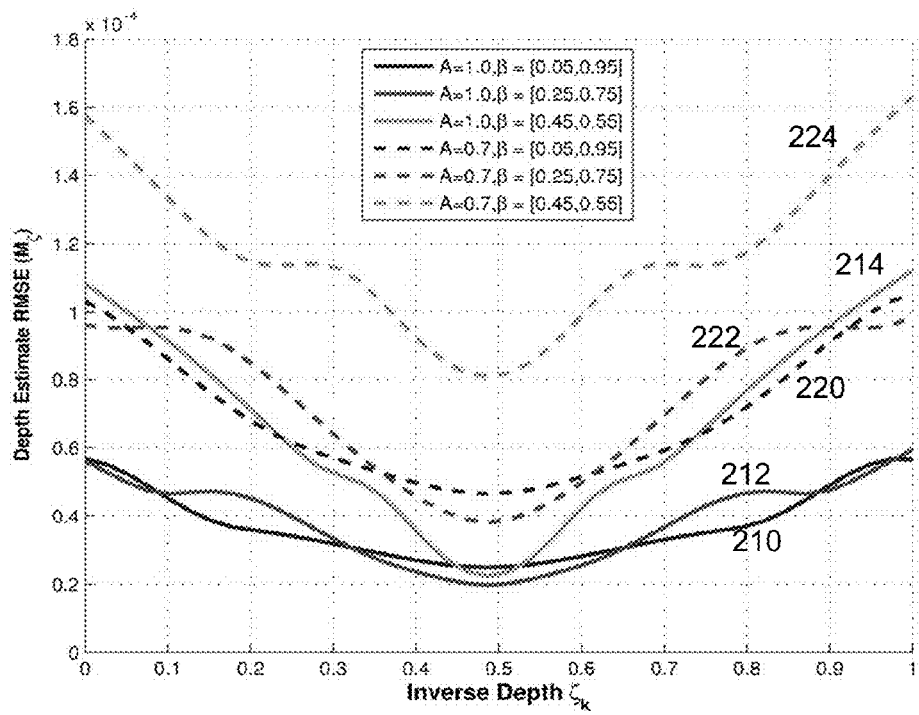
FIG. 2 graphs the asymptotic RMSE performance as a function of the inverse depth $\zeta$ for different sets of acquired images.
Figure 3A:
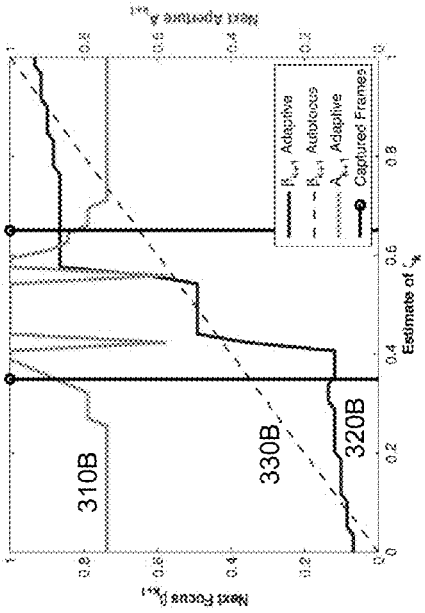
FIGS. 3A-3D are graphs that illustrate the adaptation of acquisition setting, as a function of the estimated depth and for different initial sets of two images.
Figure 3B:
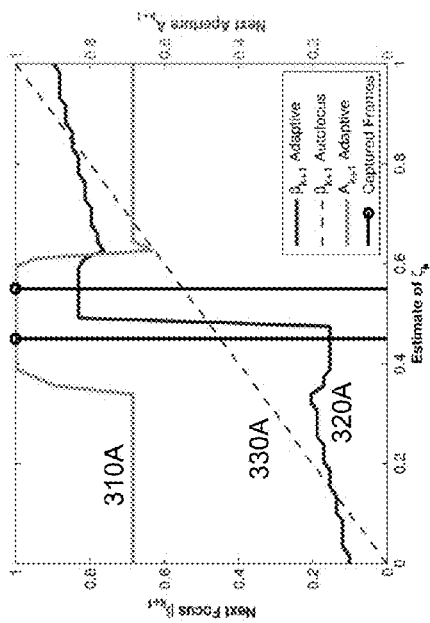
Figure 3C:
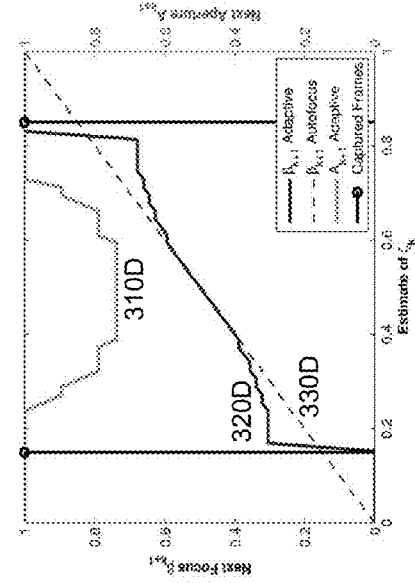
Figure 3D:
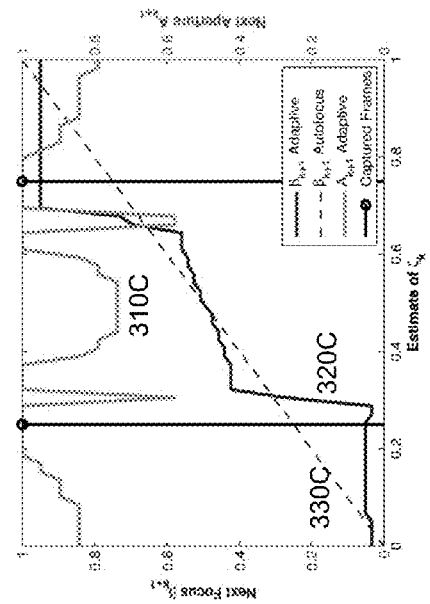

FIG. 2 graphs the asymptotic reconstruction MSE (RMSE) performance as a function of the inverse depth $\zeta$ for different sets of acquired images. Each curve is the graph for a different set of two images. For the three solid curves 210, 212, 214, the aperture is open all the way at A=1.0. The three curves correspond to different separations of the frame pair. The two images in the set are taken at inverse focal settings of $\beta$=[0.05, 0.95] for curve 210, $\beta$=[0.25, 0.75] for curve 212 and $\beta$=[0.45, 0.55] for curve 214. The dashed lines 220, 222, 224 compare the RMSE performance for the same depth separations but with a reduced aperture of A=0.7. Curves 220, 222, 224 correspond to $\beta$=[0.05, 0.95], $\beta$=[0.25, 0.75] and $\beta$=[0.45, 0.55], respectively.

Generally speaking, the information content decreases and the RMSE increases, as the aperture is reduced. This behavior is expected as optical systems should become less sensitive to defocus with slower F/#. Also, the information is maximal and RMSE is minimal when the object distance is halfway between the captured frames $\zeta=(\beta_1+\beta_2)/2$. The amount of information does not, however, monotonically increase with focus separation.

III.B. Determining Acquisition Setting Based on RMSE

If no information is known a priori, to provide an initial estimate of both the image s and the inverse depth $\zeta$ requires at least two different frames (in this example, taken at different focal setting b and/or aperture A). These initial frames can also be used to approximate the average signal strength $\alpha_S$. The acquisition settings for these initial frames can be determined in a number of ways. For example, the initial acquisition settings can be optimized based on statistical priors placed on the unknown inverse depth $\zeta$ and the image signal s. For the following example, however, assume that the initial frames are captured by perturbing the initial aperture and focal setting.

After obtaining the k≥2 initial frames, apply the multiframe reconstruction algorithm to the image set to obtain an estimate of the image $\hat{s}_k$ and the inverse depth $\hat{\zeta}_k$. For example, Eq. 6 can be applied to estimate the image $\hat{s}_k$, and minimization of the cost function of Eq. 7 can be used to estimate the inverse depth $\hat{\zeta}_k$. In this notation, the subscript k signifies the estimate of the image and the inverse depth for a set with k images. Use the asymptotic properties of the CR bound to construct a posterior distribution on the depth location. Since the depth estimation error becomes approximately Gaussian asymptotically, suppose that distribution of the estimate $\hat{\zeta}_k$ for a given inverse depth $\zeta$ is also Gaussian $$p(\hat{\zeta}_k, \zeta) \sim N(\zeta, M_\zeta(\Phi_k)). \tag{15}$$

In other words, optimistically suppose that the variance achieves the CR bound. Then construct a posterior distribution on $\zeta$ given the estimate $\hat{\zeta}_k$ according to $$p(\zeta | \hat{\zeta}_k) = \frac{p(\hat{\zeta}_k | \zeta) p(\zeta)}{\int p(\hat{\zeta}_k | \zeta) p(\zeta)}, \tag{16}$$

where $p(\zeta)$ is some prior on the inverse depth. For sake of example, assume that this is a flat prior. Then compute the posterior distribution via integration. This one-dimensional integration is numerically tractable.

Now construct a cost function that will maximize imaging performance given the initial estimates of the object and inverse depth. One example cost function is $$C_s(\varphi_{k+1}) = Tr \int_\zeta M_s(\hat{s}_k, \hat{\zeta}_k, \Phi_{k+1}) p(\zeta | \hat{\zeta}_k) d\zeta. \tag{17}$$

This cost function reflects the expected reconstruction MSE over the distance posterior distribution. In this way, the confidence in the depth estimate $\hat{\zeta}_k$ is balanced with the reconstruction MSE penalty. Now minimize the cost function with respect to $\phi_{k+1}$ to estimate the acquisition setting for capture of the (k+1)st image.

FIGS. 3A-3D are graphs that illustrate the adaptation of acquisition setting based on Eq. 17, as a function of the estimated depth, and for different initial sets of two images. In all of these examples, an initial set of two images is acquired at a predetermined depth spacing and at full aperture A=1. The predetermined depth spacing varies from one figure to the next. The two images are acquired at $\beta$=[0.45, 0.55] in FIG. 3A, at $\beta$=[0.35, 0.65] in FIG. 3B, at $\beta$=[0.25, 0.75] in FIG. 3C, and at $\beta$=[0.15, 0.85] in FIG. 3D. These initial acquisition settings for the focal setting $\beta$ are marked by the two heavy vertical lines in each figure.

Based on the two initial images, the adaptive acquisition module estimates the object depth $\hat{\zeta}_2$, and determines suggested acquisition setting for focus $\beta_3$ and aperture $A_3$ for the next image to be acquired, based on minimizing the cost function of Eq. 17. In each of the figures, curve 320 graphs the suggested focal setting $\beta_3$ as a function of the estimated object depth $\hat{\zeta}_2$, and curve 310 graphs the suggested aperture $A_3$ as a function of the estimated object depth $\hat{\zeta}_2$. In all these figures, the inverse depth $\zeta$, aperture A, and inverse focal setting $\beta$ are all normalized to the range [0, 1].

As a point of reference, the dashed line 330 shows the focal setting $\beta_3$ for an overly optimistic autofocus algorithm. For curve 330, the estimate $\hat{\zeta}_2$ is trusted completely. The back focus is chosen to focus exactly on the estimated depth and the aperture is set to a full aperture.

Note that in this example, there is a certain symmetry to the optimized acquisition setting with respect to the location of the initial frames. When the initial image pairs are closely spaced (e.g., $\beta$=[0.45, 0.55]), the adaptive acquisition module decides that there is insufficient information to reliably estimate depth and encourages sampling away from the current frames. The focal setting for the third image is chosen far from the previous estimates regardless of the depth estimate. The algorithm chooses a location either much closer or much farther from the current sampled locations depending on $\hat{\zeta}_2$. If the depth estimate is near the previously acquired frames, then the adaptive acquisition module assumes that the previous frames will be sufficient for reconstruction and encourages sampling a new depth space while increasing the SNR by opening the aperture.

At the other extreme, when the frames are widely separated (e.g., $\beta$=[0.15, 0.85]), the adaptive acquisition module trusts the estimates in between the two frames and chooses $\beta_3 = \hat{\zeta}_2$ approximately but shrinks the aperture to account for estimated uncertainty. As the depth estimates approach the previously sampled depth locations, the algorithm encourages sampling a new depth plane to acquire more information and opens the aperture to improve SNR. This optimization algorithm produces nonlinear, yet explainable acquisition setting for the third frame.

FIGS. 4A-4D use the same notation as FIGS. 3A-3D, but illustrates a different situation. Again, the heavy vertical lines mark the focal setting $\beta$ for the two initial frames, curves 420 graph the suggested focal setting $\beta_3$ as a function of the estimated object depth $\hat{\zeta}_2$, and curves 410 graph the suggested aperture $A_3$ as a function of the estimated object depth $\hat{\zeta}_2$. Curve 430 is the optimistic reference.

This example illustrates the relationship of the signal texture on adaptation of the acquisition setting. Signal texture is important to estimating depth from a pair of frames. In this example, the performance is computed using an image signal with a power spectral density given by $$P_s(\rho) = \frac{1}{|\rho|^\gamma}.$$

As $\gamma$ increases, the signal becomes smoother, reducing the amount of texture needed for estimating the depth.

Figure 4B:
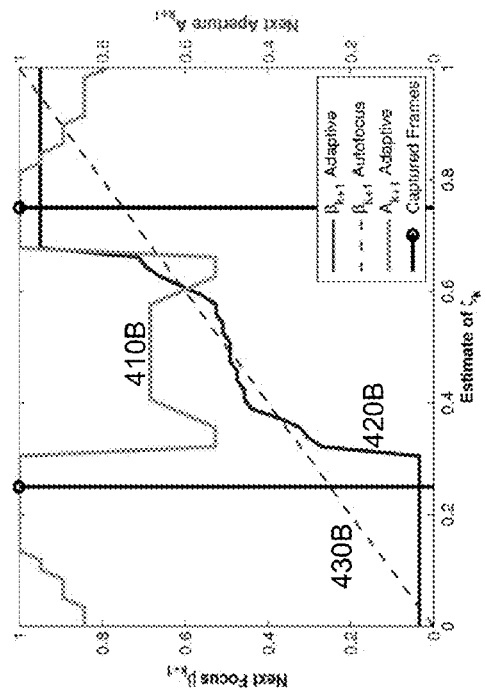
FIGS. 4A-4D are graphs that illustrate another adaptation of acquisition setting, as a function of the estimated depth and for different initial sets of two images.
Figure 4D:
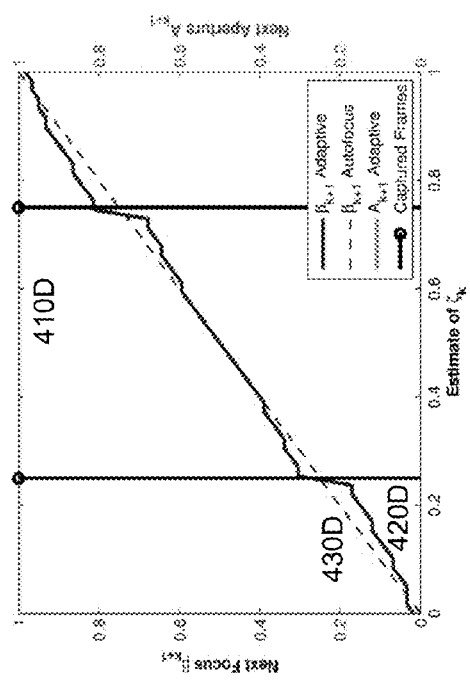
Figure 4A:
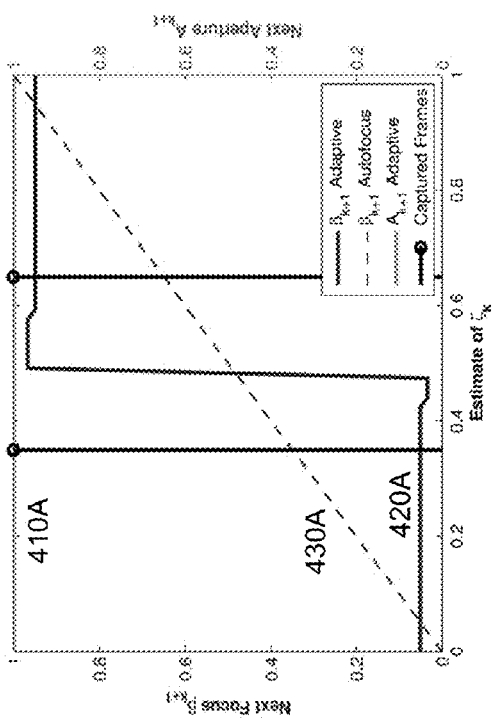
Figure 4C:
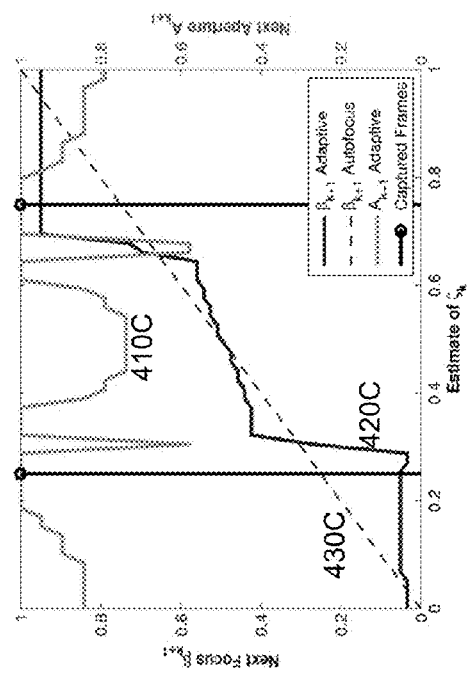

FIGS. 4A-4D illustrate cases of increasing texture. In FIG. 4A, the signal has negligible texture ($\gamma$=2.0). In this case, the depth estimate is poor enough that the optimized settings are given by $\beta_3$=0.5±0.45 and $A_3$=1.0. In this way, the algorithm attempts to extract the information with which to most accurately estimate the object depth. As the amount of signal texture increases, the depth information becomes sufficient in between the initial frames to warrant focusing at this location, albeit with a small aperture. As the depth estimates move closer to the previously sampled depth locations, however, the algorithm encourages sampling a new portion of the depth space as the previous frames are assumed to be sufficient for reconstruction purposes. At the other extreme when the signal contains significant texture ($\gamma$=1.1, FIG. 4D), the algorithm has strong confidence in the depth estimates and the optimization algorithm mimics the autofocus algorithm.

III.C. Determining Acquisition Setting Based on RMSE and Energy Constraints

In many applications, considerations other than maximizing reconstruction performance can also be important. For example, energy conservation and extending battery life is important for consumer digital cameras and other portable devices. Accordingly, consider an example cost function that combines a predictor of performance as well as a cost function associated with changing the aperture and focal settings (e.g., since changing focus or aperture size may require mechanical movement that drains a battery). This example cost function has the form $$C(\Phi_{k+1}) = C_s(\hat{s}_k, \hat{\xi}_k, \Phi_{k+1}) + E(\Phi_{k+1}) \quad (18)$$

The first term accounts for the RMSE performance and the second term $E(\Phi_{k+1})$ captures the penalty on changing the acquisition setting. This penalty function combines the cost associated with the energy required to change the acquisition setting as well as those reflecting the time lag required to change the acquisition setting. In a simplified model, the cost function might take the form $$E(\Phi_{k+1}) = c_A |A_{k+1} - A_k|^{\alpha_A} + c_b |d_{k+1} - d_k|^{\alpha_b}. \quad (19)$$

where $c_A$, $c_b$, $\alpha_A$ and $\alpha_b$ are constants. In the simulations presented below, $\alpha_A = \alpha_b = 2$. Since moving a lens system requires much more energy and time than changing the aperture setting, a relative weighting of $c_A/c_b = 50$ was used. The actual coefficients should be tuned for the particular SNR values associated with the imaging system in order to combine the different dimensions of MSE and energy.

After acquiring a new image $y_k$ using the adapted acquisition setting, multiframe reconstruction can be applied to the larger set of images. The previous estimate of the depth can be used as the initial starting point for optimizing the cost function of Eq. 19. This process repeats until sufficient image quality is achieved, or the maximum number of exposures are acquired, or some total energy consumption has been reached.

III.D. Objects with Spatially-Varying Depth

The description above assumed that the object was planar and located at a single depth. This was assumed for purposes of clarity and is not a limitation. In more complicated scenes having variable depths, the adaptation of acquisition setting can consider different depths for different field locations. In other words, the depth can be modeled as a function of the spatial location $z(x_1, x_2)$. The object can be modeled as a spatially-varying or multi-depth object. In some cases, each row of the PSF matrix $H(z(x_1, x_2))$ may change.

One alternative is to apply the algorithm described above to different tiles over the image field where the depth is assumed to be constant within the tile. In this case, the cost function will use a weighted sum of the predicted MSE computed via Eq. 18 over the set of tiles. Another approach uses only the maximum MSE over the tiles in a greedy approach to minimizing global MSE.

Figure 5B:
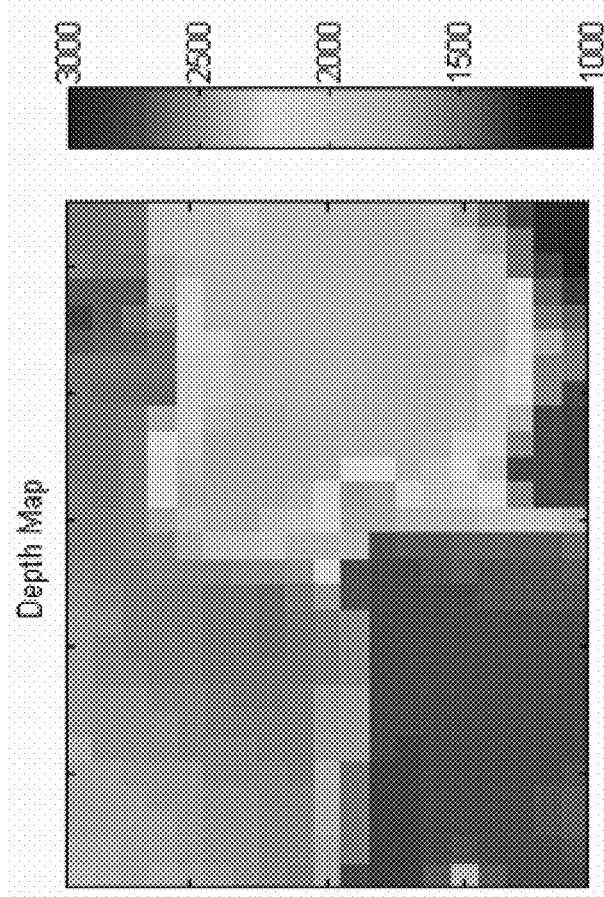
FIGS. 5A-5B illustrate an example where the object scene is divided into tiles of constant depth, but each tile may have different depths.

FIG. 5 shows an example of tiling the imaging field and assuming constant depth within a particular tiled region. FIG. 5B shows an estimated depth map. Each of the square sub-regions is a constant color because it represents a tile modelled to be at constant depth.

Estimating depth is important to the example described above. In the above example, it is estimated by minimizing the cost function of Eq. 7. However, depth can be estimated using different techniques, for example, using filter banks. In one approach, the images are filtered by a bank of bandpass filters. The energy at the outputs of the filters is used to estimate the depth. This can even be done on a per-pixel basis. The filter outputs can then be combined on a weighted basis according to the depth estimate for that pixel. Depth segmentation can be added to improve accuracy and reduce complexity. One advantage of the filter bank approach is that it is not as computationally intensive as the approaches described above.

In one approach, instead of building a model of the image as a function of defocus, and hence depth, a model of the filtered image is constructed as a function of defocus. Assume that the OTF of the system is mostly rotationally symmetric. Now use a bank of rotationally-symmetric bandpass filters. Such filters capture the image spectral content within a rotationally symmetric region in frequency space. Denote the set of filters used as $F_j(\rho)$, $j = 1 \ldots P$ where j identifies the filter band pass radial frequency. For simplicity, consider a set of bandpass filters in which the center frequency of the bandpass filter is given by $\rho_j = j/P + 1$. The output of these filters is equivalent to projecting the two-dimensional image spectrum onto a one-dimensional subspace defined by the rotationally symmetric filters. In doing this, the computational complexity of the nonlinear depth estimation process can be greatly reduced by lowering the dimensionality of the data.

Figure 6:
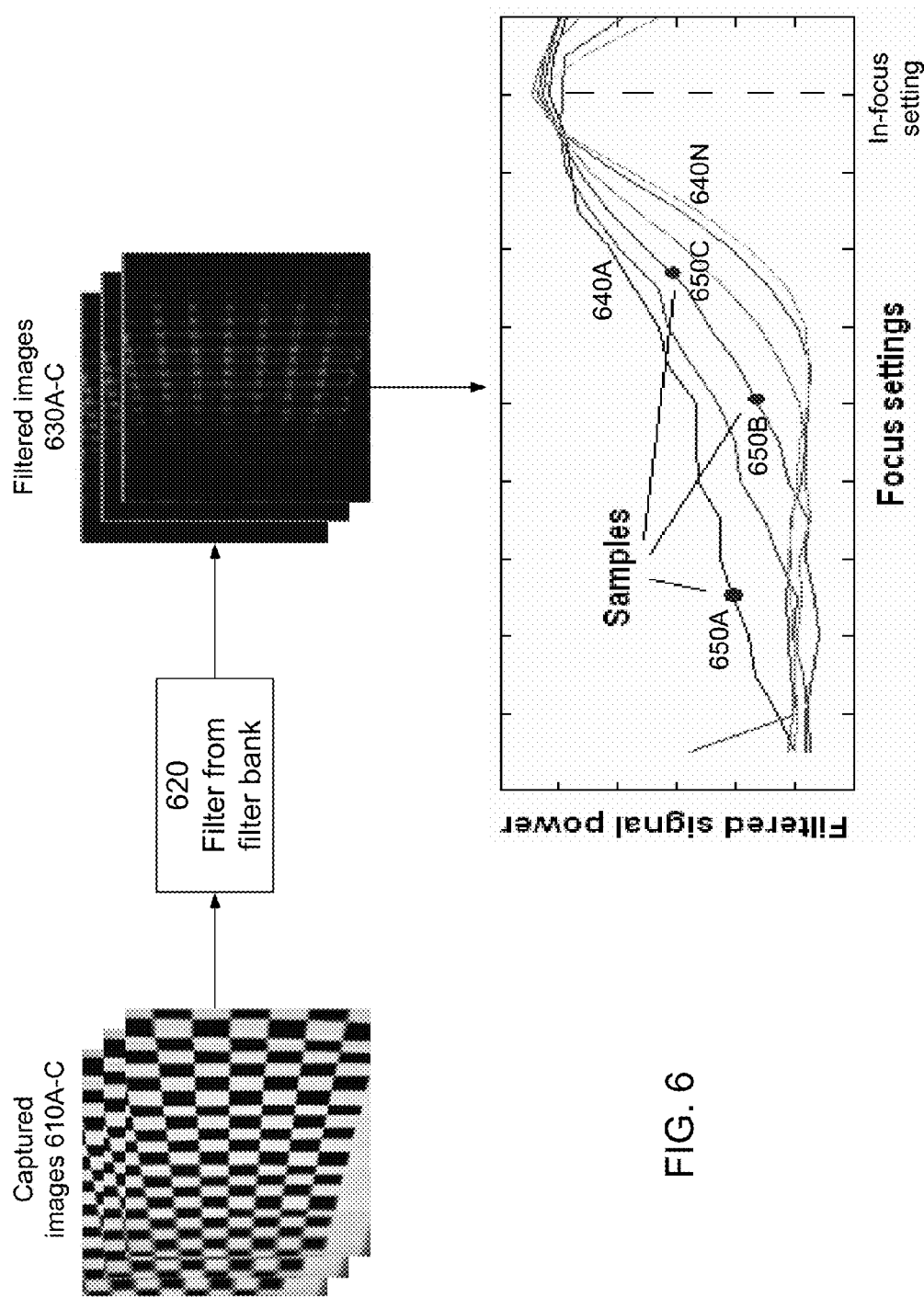
FIG. 6 is a diagram illustrating depth estimation using filter banks.

FIG. 6 shows a representative diagram of the filter-based depth estimation. When an acquired image 610A-C is filtered by a particular bandpass filter 620 from the filter bank, the corresponding output signal 630A-C captures the amount of texture in the input image. Each of the curves 640A-N shown in FIG. 6 show the output of a particular filter 620 as a function of the focus settings (x-axis) for different aperture settings. In actuality, if three images 610A-C have been captured, only three sample points 650A-C will be known (although those sample points can be determined for each tile or even each pixel). Represent the gain of the jth filter as a function of the inverse depth and the aperture settings as $g_j$ ($\zeta$, $\phi$). The gain functions have their maximum value at the focal distance where the object is in best focus. The peakedness of the curves depends on the size of the aperture. The approach of filter-based depth estimation is to use a set of filter outputs (samples) for a small number of frames to estimate the location of the peak. Once the peak is estimated, the object distance can be estimated.

In this example, estimate the inverse depth for the ith pixel using a nonlinear cost function of the form $$J(\zeta) = \sum_j \frac{\left| \sum_k \frac{1}{\sigma_{jk}^2} g_j(\zeta, \varphi_k) * c_{kji} \right|^2}{\sum_k \frac{1}{\sigma_{jk}^2} |g_j(\zeta, \varphi_k)|^2 + P_{s_j}^{-1}} \quad (20)$$

where $g_j(\zeta, \phi_k)$ is the output function for the jth filter as a function of depth z; and $c_{kji}$ is the measured filter output for the ith pixel, jth filter, using the acquisition settings for the kth acquired image. The value of $\sigma_{jk}$ is the noise associated with the jth filter with the kth acquisition settings. $N^2$ represents the size of the image. This is defined as $$\sigma_{jk}^2 = \frac{\sum_{w,v} F_j(w, v)}{N^2} \sigma_k^2. \quad (21)$$

The term $Ps_j$ is the expected filter output statistical prior defined by $$P_{s_j} = \sum_{w,v} F_j(w, v) P_s(w, v), \quad (22)$$

The terms $\sigma_k^2$ and $P_s(w, v)$ are as previously defined.

The filter-based depth estimation is based on modelling the filter output as a function of the filter set. This involves a calibration process to model the filter output gain functions. One choice for modelling the filter output is a Gaussian function, with mean as a function of inverse focus setting and the variance as a function of aperture setting and the focus setting according to:

$$g_j(A_k, \beta_k, \zeta) = (b_0^j + b_1^j A_k) \exp\left\{-\frac{(\beta_k - \zeta)^2}{2(b_3^j + b_4^j \beta_k)^2}\right\}. \quad (23)$$

In this formulation, the b terms are tuning parameters for this particular gain function chosen at calibration time. When calibrating, use the ground true inverse depth as input and estimate the parameter settings for each filter. Other functional forms of the filter output (23) can be used. The ideal filter output model represents the filter output as a function of inverse depth for a wide range of signals.

Figure 7:
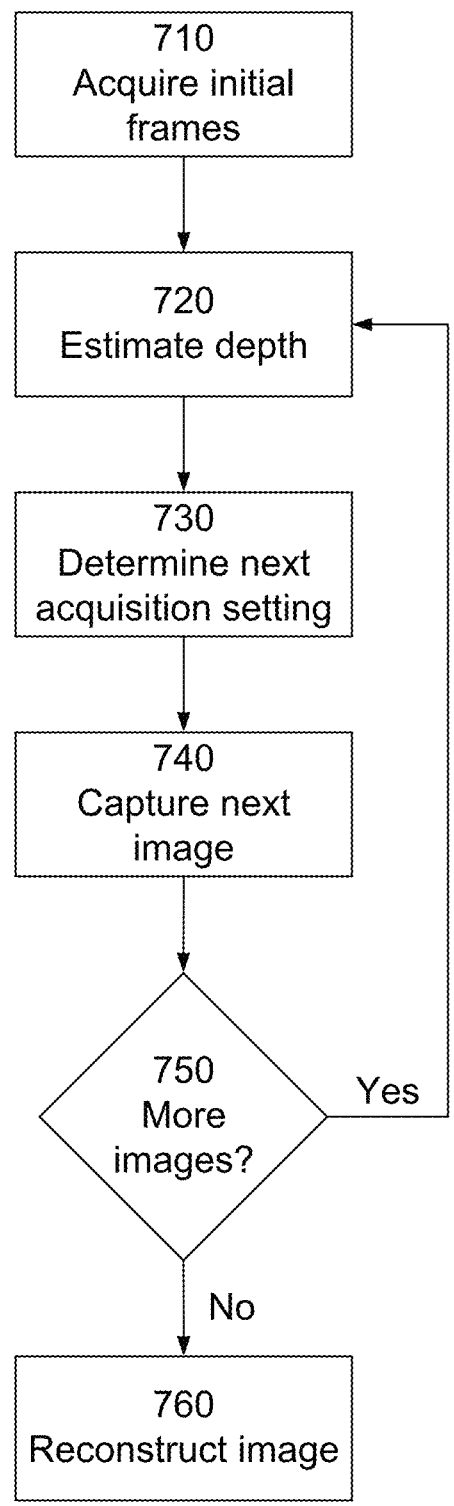
FIG. 7 is a flow diagram illustrating adaptive multiframe reconstruction using depth estimation based on filter banks.

FIG. 7 is a flow diagram illustrating adaptive multiframe reconstruction using depth estimation based on filter banks. In this example, the first two frames are acquired 710 at predetermined acquisition settings. The depth is then estimated 720 based on the acquired frames and minimizing the cost function of Eq. 20. Given the estimated depth, the next acquisition setting is determined 730 by minimizing the cost function of Eq. 18. The next image is acquired 740 using the suggested acquisition setting. The cycle repeats 750 if more images are to be acquired. Otherwise, image acquisition is completed and the acquired images are used in multiframe reconstruction 760 to reconstruct the image.

IV. Simulation Results

The specific adaptive acquisition strategy described above was simulated based on the imaging system described in Table. 1. The simulated test image is a traditional spoked target pattern. The image grayscale values are normalized such that the maximum grayscale value is one. This provides a general SNR at full aperture of 26 dB. The image is 120×120 pixels in size.

TABLE 1

Camera Specifications for Simulations

| Parameter | Value |
| --- | --- |
| Focal length | 12 mm |
| F/# range | [2.6, 9.0] |
| λ | 0.5 μm |
| Undersampling factor | 6 |
| back focus range | [12.00, 12.15] mm |
| $\sigma_r$ | 0.01 |
| $\sigma_s$ | 0.02 |

The object is assumed to be a planar object at a depth of z=2 m from the front of the camera. The initial camera acquisition settings are $A_0$=0.6, $d_0$=12.00 mm and $A_1$=1.0, $d_1$=12.006 mm. These back focal distances correspond to a camera focused at infinity for the first frame and at 24 meters from the front of the camera for the second frame. The multiframe reconstruction algorithm of Eq. 7 yields a poor initial estimate of the depth to be $\hat{z}$=3.73 m. The reconstructed image using this poor depth estimate is itself quite poor.

Figure 8:
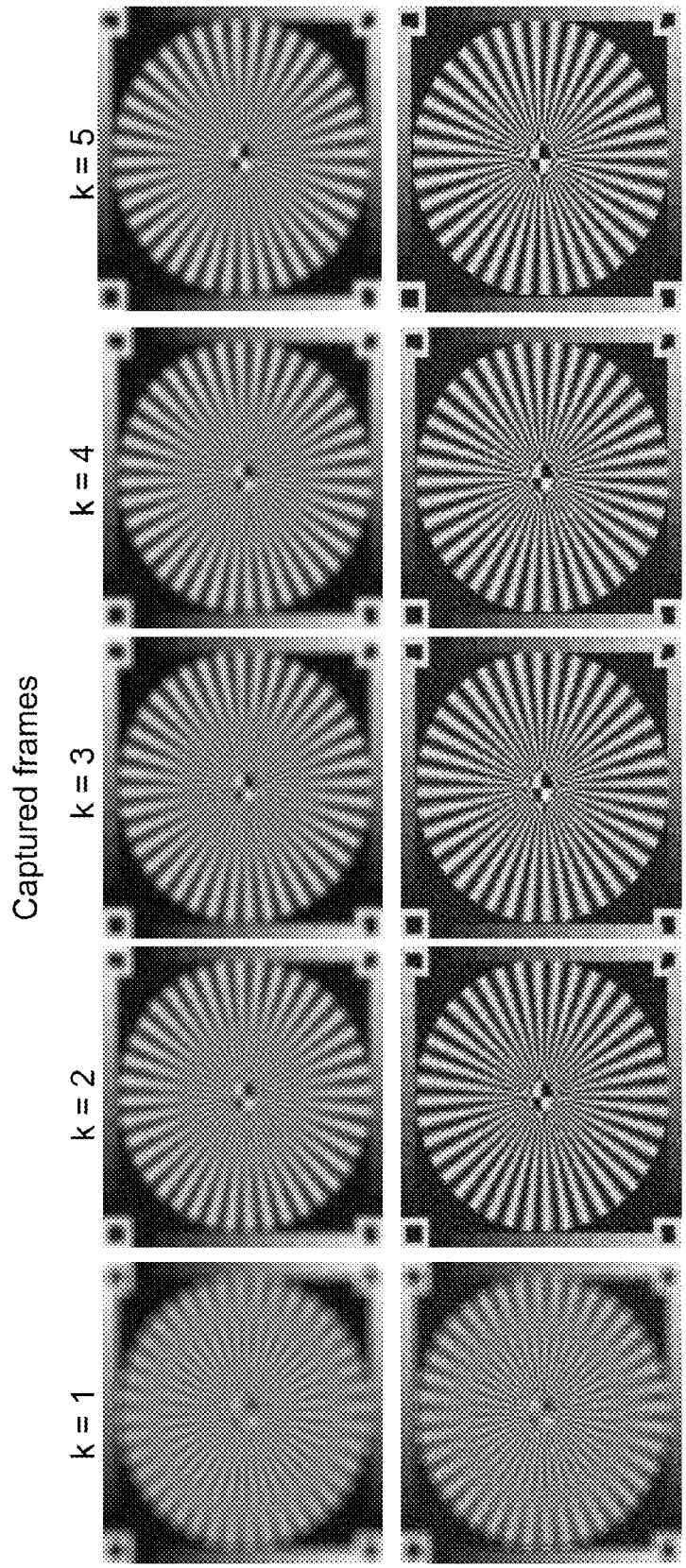
FIG. 8 contains images illustrating the adaptive acquisition of images for multiframe reconstruction, and the resulting multiframe reconstruction.

FIG. 8 shows the simulation where the camera is allowed to acquire up to six images total. In this simulation, the penalty function of Eq. 18 is set to severely penalize changing both the focal settings β and the aperture settings A. The top row of images in FIG. 8 show the captured frames $y_k$ as a sequence in time. The first frame $y_0$ is not shown. The bottom row of images of FIG. 8 show the reconstructed images $\hat{s}_k$ as the number of frames increases. Thus, the first image in the bottom row shows the reconstructed image after the camera has acquired the initial two images.

The acquisition settings were determined using the cost function of Eq. 18 with a strong penalty on changing the acquisition settings. Consequently, after k=4, the adaptive acquisition module chooses not to incur the penalty of changing the acquisition setting further even though the acquired image $y_5$ is obviously still out of focus. The reconstructed image, however, shows reasonable quality. After acquiring the third frame, the algorithm correctly estimates the depth at $\hat{z}_2$=1.99 m. This estimate improves with continued iteration. The dynamically determined acquisition settings for this first experiment are shown in Table 2. The acquisition settings stop changing after k=4 as the energy penalty required to improve the performance prevents the algorithm from further change. At k=5, the camera is focused at a depth plane corresponding to 4.8 m from the camera.

TABLE 2

Acquisition Settings for Simulation 1 (FIG. 8)

| Frame | $A_k$ | $d_k$ |
| --- | --- | --- |
| 0 | 0.6 | 12.000 mm |
| 1 | 1.0 | 12.006 mm |
| 2 | 0.8 | 12.018 mm |
| 3 | 0.9 | 12.024 mm |
| 4 | 1.0 | 12.030 mm |
| 5 | 1.0 | 12.030 mm |

Figure 9:
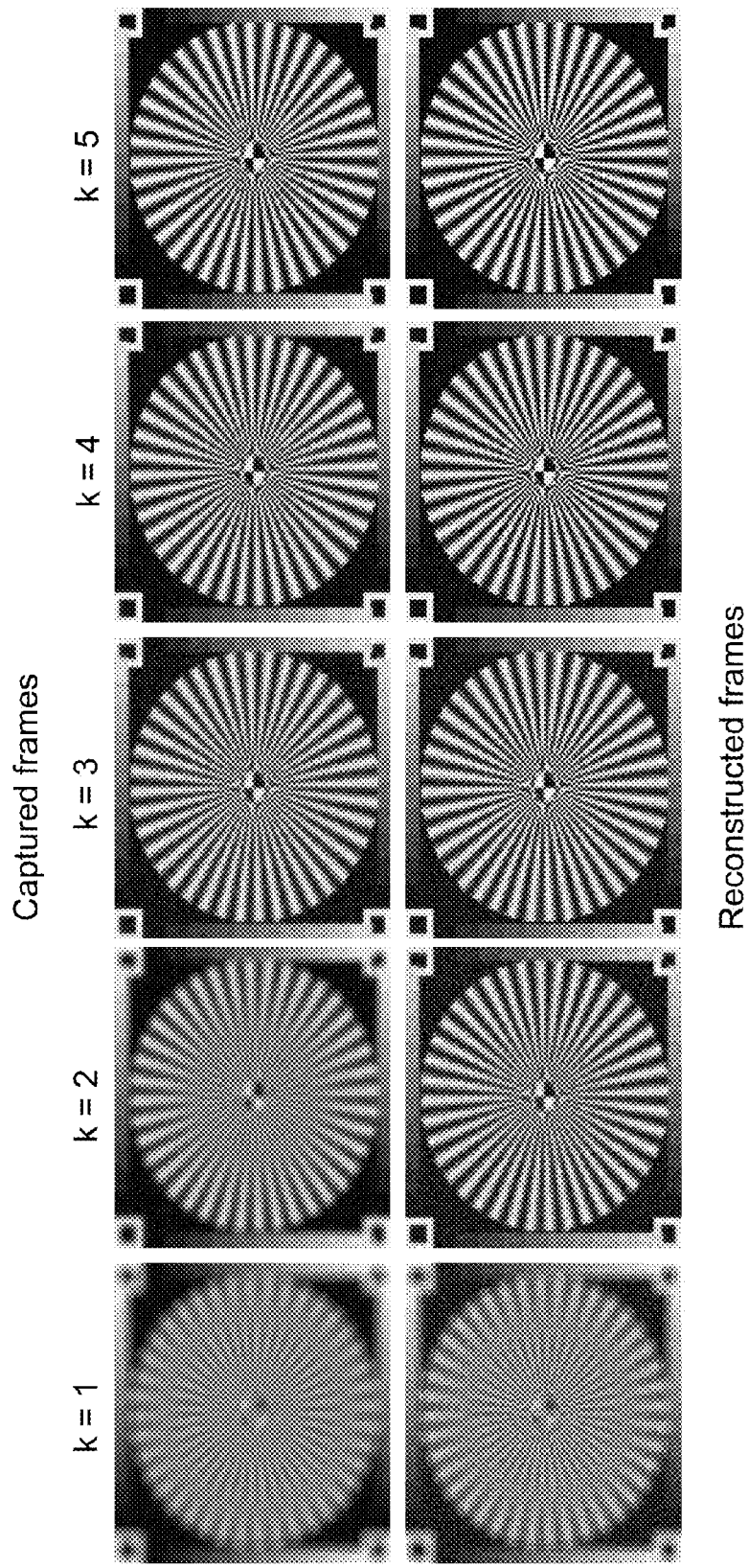
FIG. 9 contains more images further illustrating the adaptive acquisition of images for multiframe reconstruction, and the resulting multiframe reconstruction.

FIG. 9 shows a second simulation, where the energy penalty function coefficients are reduced by a factor of three. Changing the penalty function in this way allows the algorithm more flexibility in changing the acquisition setting during dynamic imaging. The resulting settings are shown in Table 3. The settings in the second experiment show a greater change between different frames compared to the first experiment. By frame k=5, the camera has shifted the focus to a plane corresponding to 2.5 m from the camera. At this point, the object is in nearly perfect focus. FIG. 9 shows the images corresponding to the second experiment. As before, the top images of FIG. 9 show the captured frames $y_k$. Visual inspection of $y_5$ shows the captured image to be nearly in focus. The bottom row of images show the resulting reconstructed frames. As expected, the reconstructed images show better performance than those produced with a strong energy penalty.

TABLE 3

Acquisition Settings for Simulation 2 (FIG. 9)

| Frame | $A_k$ | $d_k$ |
|---|---|---|
| 0 | 0.6 | 12.000 mm |
| 1 | 1.0 | 12.006 mm |
| 2 | 0.9 | 12.024 mm |
| 3 | 0.6 | 12.042 mm |
| 4 | 0.8 | 12.054 mm |
| 5 | 1.0 | 12.061 mm |

Figure 10:
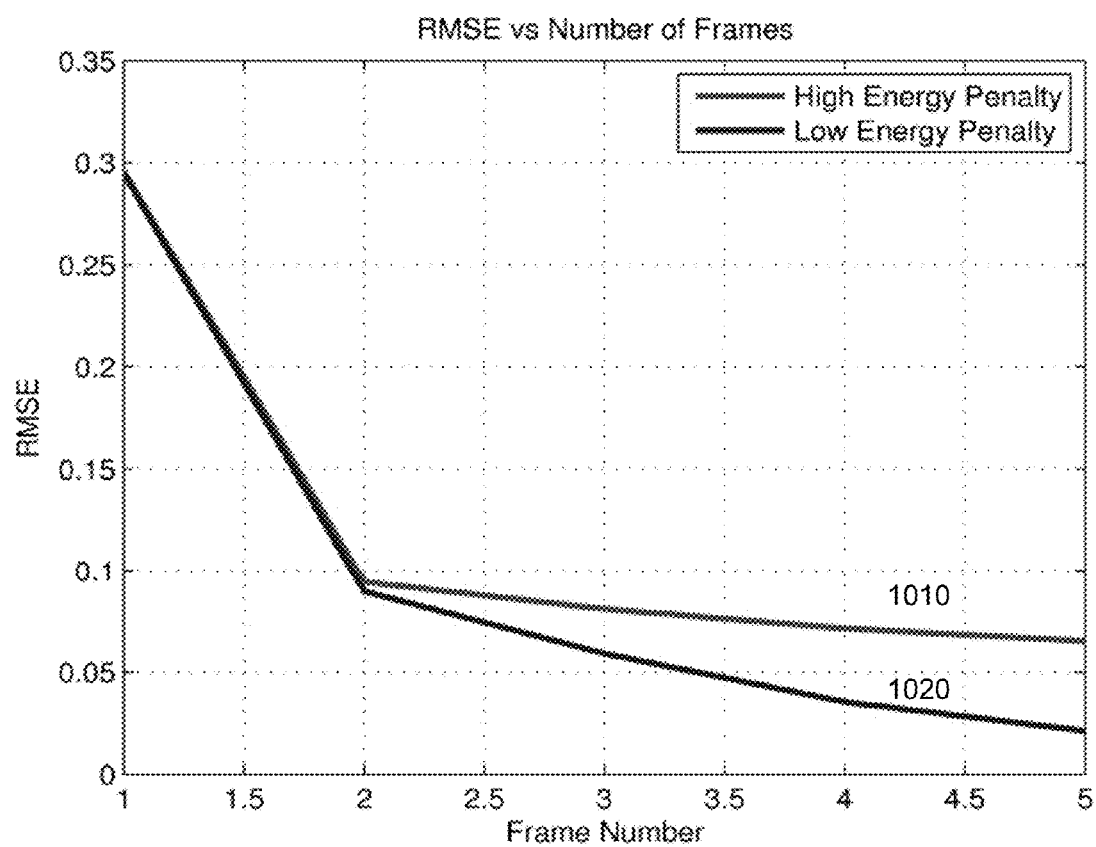
FIG. 10 is a graph of RMSE as a function of number of images.

FIG. 10 compares the RMSE performance as a function of frame number k between the two experiments. As expected, the weaker penalties on changing the acquisition setting in simulation 2 (curve 1020) allows for improved performance relative to the strong penalties of simulation 1 (curve 1010). What is perhaps more interesting, however, is the small difference in absolute terms. The resulting image in simulation 1 may suffice given the power savings. In one variation, the penalty function might change as a function of battery charge or user preference.

Figure 5A:
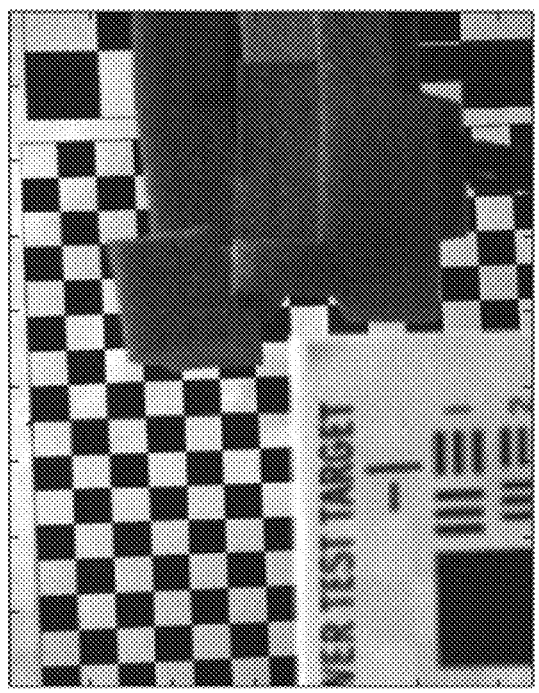

FIGS. 8-10 used a planar object (i.e., located at a single object distance). FIG. 5 illustrates an example where the object scene has multiple distances. In this example, the first two acquisition settings were predetermined and later acquisition settings were adaptively determined as described above. FIG. 5A shows the current reconstructed image. Note that the foam object in the foreground, the checkboard pattern in the background and the test target pattern in the near foreground are all in relatively good focus. FIG. 5B shows the current estimated depth map, with different colors representing different depths.

V. Further Embodiments

Although the detailed description contains many specifics, these should not be construed as limiting the scope of the invention but merely as illustrating different examples and aspects of the invention. It should be appreciated that the scope of the invention includes other embodiments not discussed in detail above. For example, acquisition parameters other than focus and aperture can be used. Exposure time T is one example. Other examples include wavelength filtering, polarization filtering, illumination control, and camera orientation. The adaptive techniques described above can be used to also determine the acquisition setting for these parameters. As another example, the initial set of images in the examples above was acquired based on predetermined acquisition settings. In alternate embodiments, these acquisition settings may also be optimized, for example based on signal and/or depth prior information. As another variation, different optimization techniques based on the CR bound might be used. For example, rather than using a local search technique, optimization could be based on a maximum $\Delta_\Phi$ search range and computing optimal settings via exhaustive search. Functions other than the CR bound or ML estimation could also be used. Fast filter approximations can also be used to solve the multiframe reconstruction and/or the depth estimation algorithms.

As a final example, acquisition settings may be determined based on acquiring multiple next frames rather than just a single next frame. In the examples above, an initial set of two images was acquired. Based on this two-frame set, the acquisition setting for a third frame were then determined, but without taking into account the possibility that a fourth or fifth frame might also be acquired. In an alternate approach, the acquisition settings are determined with the goal of increasing overall performance over several next frames, or for the entire final set of images. Thus, after the first two frames, the third frame may be selected based on also acquiring a fourth frame, or assuming that there will be a total of six frames (i.e., three more frames after the third frame).

In addition, the term "module" is not meant to be limited to a specific physical form. Depending on the specific application, modules can be implemented as hardware, firmware, software, and/or combinations of these. In the systems described above, the adaptive acquisition module is preferably implemented in software. However, it could also be implemented in hardware (including circuitry) or in combinations of hardware and software. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A method for multiframe reconstruction of an object comprising:
    acquiring a set of at least two images of the object, the images acquired at different acquisition settings;
    for at least one of the images, determining the acquisition setting for the image based at least in part on improving a depth estimation calculated from the set of images, wherein determining the acquisition setting also takes into account content of previously acquired images as such content relates to depth estimation; and
    applying a multiframe reconstruction to the set of images to synthesize a single image, the synthesis including calculating a depth estimation for the object.

2. The method of claim 1 wherein the steps of acquiring a set of images and determining an acquisition setting comprise:
    acquiring at least two initial images at acquisition settings that do not depend on content of previously acquired images; and
    for every image acquired after the initial images, determining the acquisition setting for the image based at least in part on improving a depth estimation calculated from the set of images, wherein determining the acquisition setting also takes into account content of previously acquired images as such content relates to depth estimation.

3. The method of claim 2 wherein, for every image acquired after the initial images, the step of determining the acquisition setting for said image does not depend on whether any additional images will be acquired after said image.

4. The method of claim 2 wherein, for at least one of the images acquired after the initial images, the step of determining the acquisition setting for said image is based at least in part on assuming that at least one additional image will be acquired after said image.

5. The method of claim 2 wherein the set of images contains K images; and, for every image acquired after the initial images, the step of determining the acquisition setting for said image is based at least in part on assuming a final set containing K images.

6. The method of claim 1 wherein the step of determining the acquisition setting for said image comprises determining the acquisition setting based at least in part on increasing new depth information captured by said image, compared to depth information already captured by previously acquired images.

7. The method of claim 1 wherein the step of determining the acquisition setting for the image further comprises:
determining the acquisition setting for said image based at least in part on reducing a total power consumption.

8. The method of claim 1 wherein the step of determining the acquisition setting for said image is based on modeling a relationship between the acquisition settings and an optical point spread function.

9. The method of claim 1 wherein the acquisition setting includes an aperture setting.

10. The method of claim 1 wherein the acquisition setting includes a focus setting.

11. The method of claim 1 wherein the acquisition setting includes an exposure setting.

12. The method of claim 1 wherein the object is modeled as a multi-depth object.

13. The method of claim 12 wherein the step of determining the acquisition setting comprises:
estimating different object depths for different tiles of the multi-depth object, based at least in part on content of previously acquired images; and
determining the acquisition setting for the image based at least in part on the estimated object depths.

14. The method of claim 13 wherein the step of determining the acquisition setting for the image is based at least in part on a weighted average over the tiles of a merit function evaluated for each tile.

15. The method of claim 1 wherein the selected acquisition setting is selected based on a Maximum-Likelihood principle.

16. The method of claim 1 wherein the selected acquisition setting is characterized by a modulation transfer function (MTF), where each zero crossing of the MTF does not occur at a spatial frequency at which MTFs for all the prior acquisition settings also have zero crossings.

17. The method of claim 1 wherein the acquisition setting is selected based also on factors not relating to a quality of the synthesized single image or an accuracy of the calculated depth estimation.

18. A non-transitory computer readable medium containing software instructions that, when executed on a computerized system, cause the computerized system to:
cause a camera to acquire a set of at least two images of the object, the images acquired at different acquisition settings;
for at least one of the images, determine the acquisition setting for the image based at least in part on improving a depth estimation calculated from the set of images, wherein determining the acquisition setting also takes into account content of previously acquired images as such content relates to depth estimation; and
apply a multiframe reconstruction to the set of images to synthesize a single image, the synthesis including calculating a depth estimation for the object.

19. A system comprising:
a camera that acquires images of an object;
a camera controller that controls the camera to acquire a set of at least two images of the object at different acquisition settings; and
an adaptive acquisition module communicating with the camera controller wherein, for at least one of the images, the adaptive acquisition module determines the acquisition setting for the image based at least in part on improving a depth estimation calculated from the set of images, wherein determining the acquisition setting also takes into account content of previously acquired images as such content relates to depth estimation.

20. The system of claim 19 further comprising:
a multiframe reconstruction module that applies a multiframe reconstruction to the set of images to synthesize a single image, the synthesis including calculating a depth estimation for the object.

* * * * *